(12) United States Patent
Mishriky et al.

(10) Patent No.: US 6,526,212 B1
(45) Date of Patent: Feb. 25, 2003

(54) OPTICAL FIBER BULKHEAD FEEDTHROUGH ASSEMBLY AND METHOD OF MAKING SAME

(75) Inventors: Nabil Mishriky, Portland, CT (US); John Grunbeck, Northford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/628,264

(22) Filed: Jul. 28, 2000

(51) Int. Cl.[7] ................................................. G02B 6/00
(52) U.S. Cl. ....................................................... 385/138
(58) Field of Search ................................. 385/138, 132, 385/136, 76

(56) References Cited

U.S. PATENT DOCUMENTS

| | | | | |
|---|---|---|---|---|
| 3,837,688 A | * | 9/1974 | Vollbehr | 285/289.1 |
| 4,413,881 A | * | 11/1983 | Kovats | 385/94 |
| 4,891,640 A | * | 1/1990 | Ip | 385/138 |
| 5,151,967 A | * | 9/1992 | Ebinuma | 385/138 |
| 5,177,806 A | * | 1/1993 | Abbott et al. | 385/76 |
| 5,253,321 A | * | 10/1993 | Long et al. | 385/138 |
| 5,588,086 A | * | 12/1996 | Fan | 385/138 |
| 6,088,504 A | * | 7/2000 | Filas et al. | 385/138 |

* cited by examiner

Primary Examiner—Lynn Field
Assistant Examiner—Brian S. Webb
(74) Attorney, Agent, or Firm—Howrey Simon Arnold & White, LLP (57) ABSTRACT

In an optical waveguide bulkhead feedthrough assembly, and method of making such an assembly, a housing includes at least one sealing surface and has a tubular member disposed therein that defines an axially elongated, annular surface, and the annular surface forms an axially elongated optical feedthrough cavity. An optical fiber or like waveguide is received through the axially-elongated optical feedthrough cavity, and is spaced radially inwardly relative to the annular surface to thereby define an axially-elongated annular cavity between the fiber and annular surface. An epoxy adhesive is introduced in its liquid phase into one end of the annular cavity, and is allowed to fill the annular cavity by capillary action. Upon filling the annular cavity, the epoxy hardens and cures and, in turn, adhesively secures the optical fiber within the tubular member. The annular surface defines a plurality of constrictions in the annular cavity to further secure the solid epoxy plug within the cavity, and prevent the plug from moving in response to axially-directed forces encountered in high pressure and/or high temperature applications. The optical waveguide bulkhead feedthrough assembly also includes an o-ring and compression seal to seal against mating bulkhead surfaces. The optical waveguide bulkhead feedthrough assembly further includes a compression nut disposed on the shoulder to fixedly mount the assembly within a bulkhead.

67 Claims, 4 Drawing Sheets

OPTICAL FIBER BULKHEAD FEEDTHROUGH ASSEMBLY AND METHOD OF MAKING SAME

CROSS REFERENCES TO RELATED APPLICATIONS

Copending U.S. patent application, Ser. No. 09/628,114 entitled "Optical Fiber Feedthrough Assembly and Method of Making Same", to Grunbeck et al., filed contemporaneously herewith, contains subject matter related to that disclosed herein.

TECHNICAL FIELD

The present invention relates to feedthroughs for optical waveguides, and more particularly, to hermetically sealed bulkhead feedthroughs suitable for use in high pressure, high temperature, and/or other harsh environments.

BACKGROUND ART

In many industries and applications, there is a need to have small diameter wires or optical waveguides penetrate a wall, bulkhead, or other feedthrough member wherein a relatively high fluid or gas differential pressure exists across the feedthrough member. In addition, one or both sides of the feedthrough member may be subjected to relatively high temperatures and other harsh environmental conditions, such as corrosive or volatile gas, fluids and other materials. In the case of electrical wires, these devices, called feedthroughs or penetrators, typically are constructed by using electrically conductive metal 'pins' having a low thermal coefficient of expansion. The pins are concentrically located within a hole in a housing, and the resulting annular space is filled with a suitable sealing glass. Critical to the success of such seals is the selection and approximate matching of the thermal expansion rates of the various materials, i.e., the metal housing, sealing glass, and electrical pin. As the temperature range over which the feedthrough is exposed increases, the matching of thermal expansion rates becomes increasingly important in order to avoid failure of the feedthrough by excessive thermal stress at the interface layers between the various materials. This technology is relatively mature for electrical feedthroughs, and commercial devices are readily available that meet service temperatures in excess of 200° C.

Figure 3:
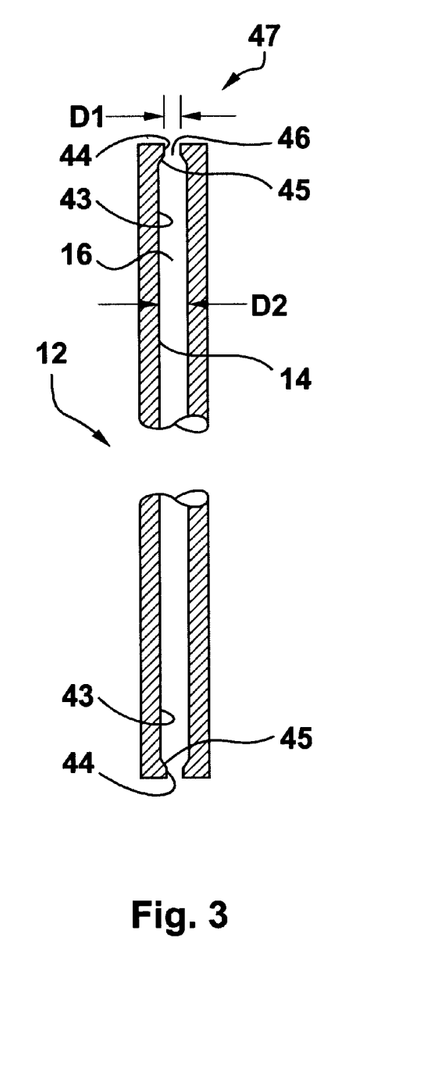
FIG. 3 is a cross-sectional view an alternative embodiment of the tubular member of the optical waveguide bulkhead feedthrough assembly of FIG. 2.

More recently, with the introduction of optical sensors, particularly sensors for use in oil and gas exploration and production, a need has emerged for a bulkhead feedthrough that can seal an optical fiber at high pressures of 20,000 psi and above, and high temperatures of 150° C. to 250° C., with desired service lives of 5 to 10 years. The sensing assembly of FIG. 3 is of the type disclosed in co-pending U.S. patent application Ser. No. 09/440,555 filed Nov. 15, 1999, entitled "Pressure Sensor Packaging For Harsh Environments", which is assigned to the Assignee of the present invention and is hereby expressly incorporated by reference as part of the present disclosure (CiDRA Docket No. CC-0198).

There are several problems associated with constructing such an optical fiber feedthrough. One of these problems is the susceptibility of the glass fiber to damage and breakage. This is due to the small size of the fiber, the brittle nature of the glass material, the susceptibility of the glass to stress corrosion cracking due to moisture exposure, and the typical presence of a significant stress concentration at the point at which the fiber enters and exits the feedthrough. Attempts to use a hard sealing glass, such as used with electrical feedthroughs, have had problems of this nature due to the high stress concentration at the fiber-to-sealing glass interface.

Another problem with sealing an optical fiber, as opposed to sealing an electrically-conductive metal 'pin' in an electrical feedthrough, is that the fused silica material of which the optical fiber is made, has an extremely low thermal expansion rate. Compared to most engineering materials, including metals, sealing glasses, and even the metal 'pins' typically used in electrical feedthroughs, the coefficient of thermal expansion of the optical fiber is essentially zero. This greatly increases the thermal stress problem at the glass-to-sealing material interface, particularly as the application temperatures rise.

One technique used to produce optical fiber feedthroughs is the use of a sealed window with a lensing system. In this technique, the optical fiber must be terminated on each side of a pressure-sealed window, thus allowing the light to pass from the fiber into a lens, through the window, into another lens, and finally into the second fiber. The disadvantages associated with this system include the non-continuous fiber path, the need to provide two fiber terminations thus increasing manufacturing complexity, and the light attenuation associated with these features.

Figure 1:
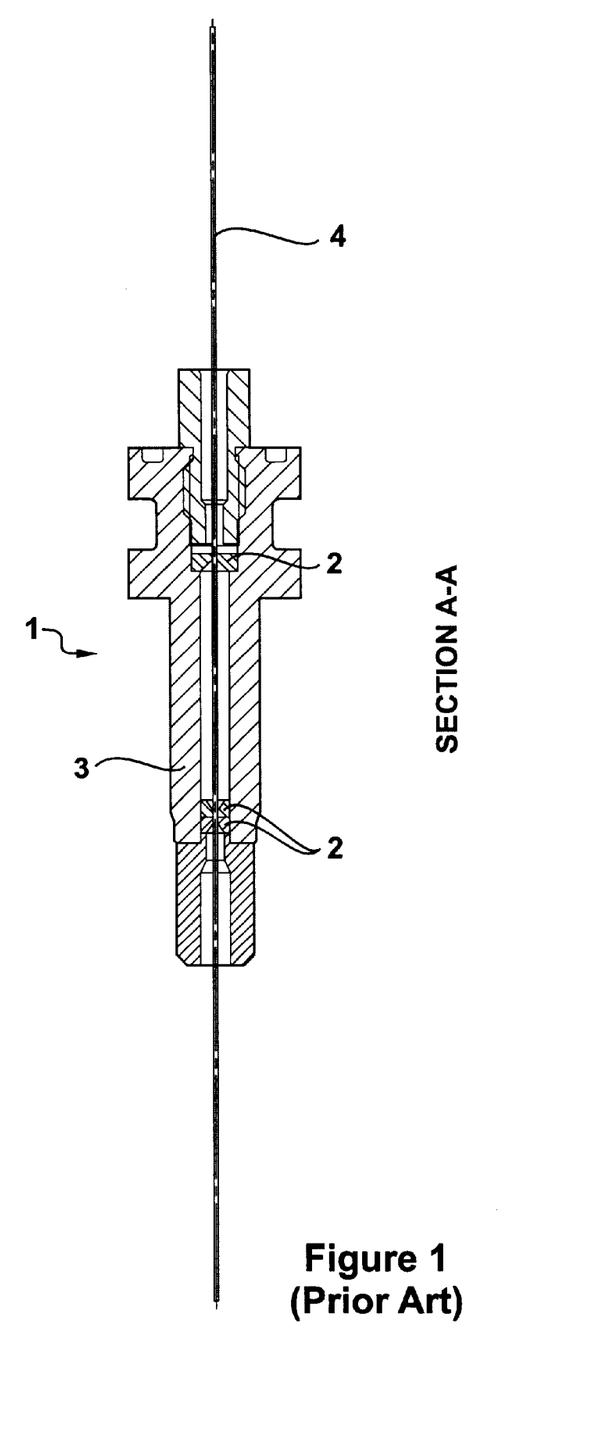
FIG. 1 is a cross-sectional view of a prior art optical waveguide bulkhead feedthrough assembly.

Another approach to producing optical fiber feedthroughs involves passing the fiber through a bulkhead without termination, while providing a seal around the fiber to prevent leakage across the bulkhead. One such prior art seal 1 is shown in FIG. 1 and is comprised of an arrangement of sapphires 2 in a compression fitting body 3 with an optical fiber 4 fed therethrough. Typically compression fitting 3 is inserted within an opening in a bulkhead or housing and captured therein by a compression nut or similar device. The sapphires 2 are arranged as shown to seal around fiber 4 by taking advantage of the pressure differential typically present across a bulkhead in a harsh environment. One disadvantage associated with this type of seal, however, is that it has been found to suffer from creep past the sapphires 2 across the bulkhead in the direction of the decreasing pressure gradient, which can, in turn, compromise both the optical fiber and seal.

It is often desirable to mount fiber optic based sensors in harsh environments that are environmentally separated from other environments by physical bulkheads. An exemplary such fiber optic based sensor is disclosed in co-pending U.S. patent application Ser. No. 09/205,944 entitled "Tube-Encased Fiber Grating Pressure Sensor" to T. J. Bailey et al., which is assigned to the Assignee of the present invention and is hereby expressly incorporated by reference as part of the present disclosure. This exemplary optical sensor is encased within a tube and certain embodiments are disclosed wherein the sensor is suspended within a fluid. Some such fiber optic sensors have sensors and tubes that are comprised of glass, which tends to be relatively fragile, brittle and sensitive to cracking. Thus, the use of such a sensor in a harsh environment, such as where the sensor would be subjected to substantial levels of pressure, temperature, shock and/or vibration, presents a significant threat of damage to the sensor. In certain environments, such sensors are subjected to continuous temperatures in the range of 150° C. to 250° C., shock levels in excess of 100 Gs, and vibration levels of 5G RMS at typical frequencies between about 10 Hz and 2000 Hz and pressures of about 15 kpsi or higher.

However, as discussed above, the harsh environments where the sensors are located generally must be isolated by sealed physical barriers from other proximate environments through which the optical fiber communication link of the sensor must pass. It is important to seal the bulkhead around the optical fiber to prevent adjacent environments from contamination, as well as to protect the optical fiber as it passes through adjacent environments. If the optical fiber is compromised by contamination from an adjacent harsh environment, the optical fiber and all sensors to which it is connected are likely to become useless. It is important to be able to seal around the fiber feedthrough without compressing the fiber and at the same time provide a seal between the feedthrough and the housing. Such housings include well head outlets, connector backshells, cable plugs, down hole mandrels, or any other housing where there is a requirement to pass a fiber feed through between a high pressure area and a low pressure area (or a second high pressure area).

Accordingly, it is an object of the present invention to provide an optical waveguide bulkhead feedthrough and scaling assembly, and a method of making such an assembly, which overcomes one or more of the above-described drawbacks and disadvantages of the prior art, and is capable of relatively long-lasting operation at relatively high pressures and/or temperatures.

SUMMARY OF THE INVENTION

The present invention is directed to an optical waveguide bulkhead feedthrough assembly for passing at least one optical waveguide, such as an optical fiber, through a sensor wall, bulkhead, well head outlet or other feedthrough member. The feedthrough assembly of the present invention comprises a housing having a tubular member or like support defining an axially elongated, annular surface, wherein the annular surface forms an axially elongated optical feedthrough cavity. The optical fiber or like waveguide is received through the axially-elongated optical feedthrough cavity, and is spaced radially inwardly relative to the annular surface to thereby define an axially-elongated annular cavity between the fiber and annular surface. A sealant, such as an epoxy adhesive, is received within and substantially fills the annular cavity. The sealant exhibits adhesive properties at the interface of the sealant and optical fiber, and at the interface of the sealant and the annular surface, to adhesively secure and hermetically seal the optical fiber within the feedthrough cavity and substantially prevent axial movement of the sealant and optical fiber relative to the annular surface.

The optical feedthrough cavity is defined by an outer dimension having one or more variations along the axial direction thereof, and the dimensional variations cooperate with the sealant to further prevent axial movement of the sealant relative to the annular surface. In accordance with an embodiment of the present invention, the annular surface of the tubular member defines one or more annular constrictions or like radially projecting interruptions forming the variations in the outer dimension of the annular cavity for further preventing movement of the epoxy or like sealant plug in the axial direction.

The housing of the optical bulkhead feedthrough includes a sealing surface for mating with a bulkhead structure and further includes a groove for receiving an o-ring for enhancing the sealing capability of the feedthrough assembly. One embodiment of the housing further includes a crushable metal seal for providing further sealing capability against the breach of high pressure past the mating bulkhead. Another embodiment of the present invention includes a bearing shoulder and a compression nut mounted thereon to releasable fixedly install the assembly within a threaded port of a mating bulkhead.

The present invention is also directed to a method of making an optical bulkhead feedthrough assembly, including the following steps: (a) forming the annular cavity of the tubular member with a predetermined width between the optical fiber and the annular surface to allow the epoxy or other sealant in its liquid phase to substantially fill the annular cavity by capillary action; (b) selecting a polymeric or other type of sealant capable of exhibiting a viscosity which allows the sealant to substantially fill the annular cavity by capillary action, and also capable of exhibiting a viscosity which substantially prevents leakage of the sealant out of the ends of the annular cavity upon filling the cavity; (c) introducing the polymeric or other sealant in its liquid phase into the annular cavity and allowing the sealant to substantially fill the annular cavity by capillary action; and (d) wherein upon filling the annular cavity, the polymeric or like sealant transitions to its solid phase and adhesively secures the fiber within the optical feedthrough cavity, and substantially prevents movement of the solid epoxy or sealant plug out of the cavity.

One advantage of the method and assembly of the present invention is that they are capable of providing an optical bulkhead feedthrough assembly with minimal leakage and high longevity in relatively high pressure, high temperature and other harsh environments.

Another advantage of the method and assembly of the present invention is that they enable the use of polymeric or like sealants having low elastic moduli to thereby significantly improve the resistance of the glass fiber to damage and breakage. Epoxies or like sealants further provide a natural strain relief at the interface between the glass fiber and the feedthrough assembly at the points where the fiber enters and exits the feedthrough. Accordingly, the various bulkhead feedthrough assemblies of the present invention may exhibit significantly lower stress concentrations and improved survivability in comparison to the prior art feedthroughs described above.

Another advantage of the method and assembly of the present invention is that they enable the use of a polymeric or like sealant having a relatively low elastic modulus to minimize any thermal stress at the interface of the optical fiber or like waveguide and feedthrough assembly. As a result, the present invention substantially avoids the problems encountered in the above-described prior art feedthroughs wherein significant thermal stresses are created at the interfaces of the optical fibers and feedthroughs due to the extremely low rate of thermal expansion of the optical fiber material in contrast to the adjoining material of the prior art feedthroughs.

A further advantage of the method and assembly of the present invention is that the feedthrough assembly may form a continuous (or uninterrupted) fiber or like waveguide path from one end of the assembly to the other. As a result, there is essentially zero light attenuation when using, for example, single mode fiber with a high numerical aperture (NA). Such high NA single mode fiber, sometimes called 'bend-insensitive' fiber, is typically used in Bragg grating-based optical fiber sensors employed in oil and gas exploration and production, where the low light attenuation properties of the fiber are particularly useful in such systems having sensors located at great distances from the light source which interrogates the sensor.

These and other objects and advantages of the present invention will become readily apparent in view of the following detailed description of preferred embodiments and accompanying drawings.

BEST MODE FOR CARRYING OUT THE INVENTION

Figure 2:
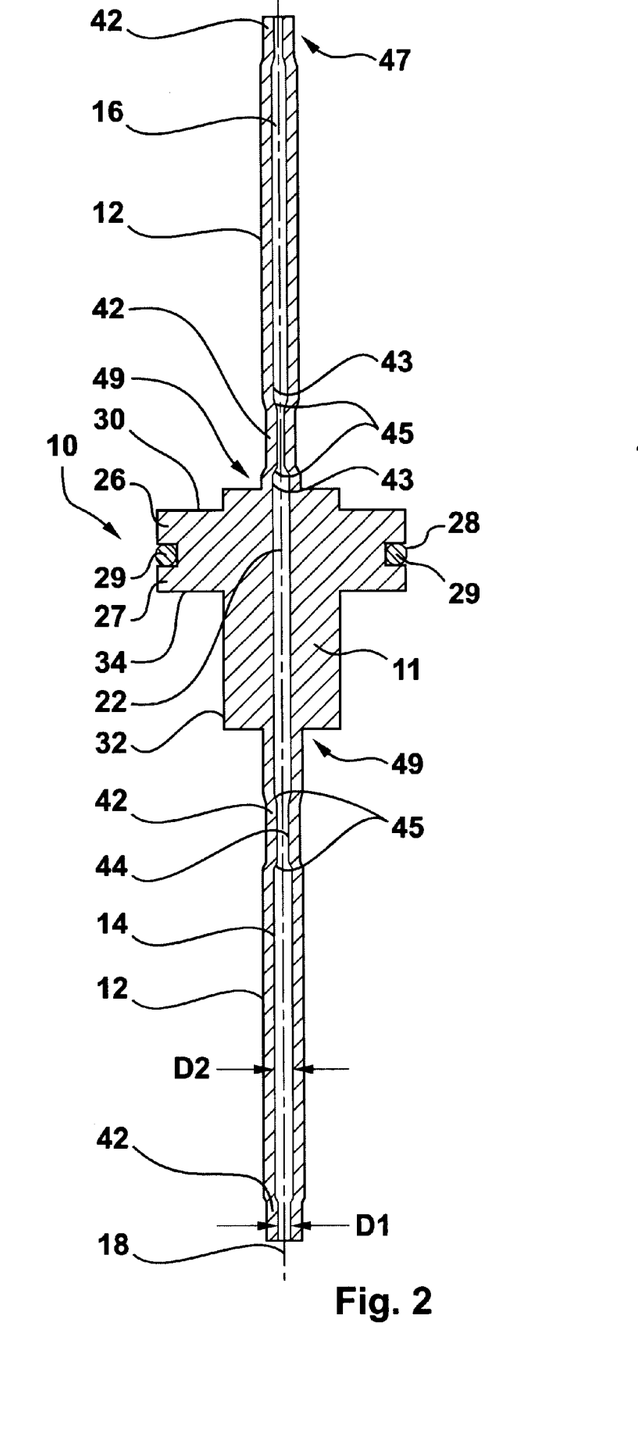
FIG. 2 is a cross-sectional view an optical waveguide bulkhead feedthrough assembly or receiving therethrough at least one optical waveguide.
Figure 4:
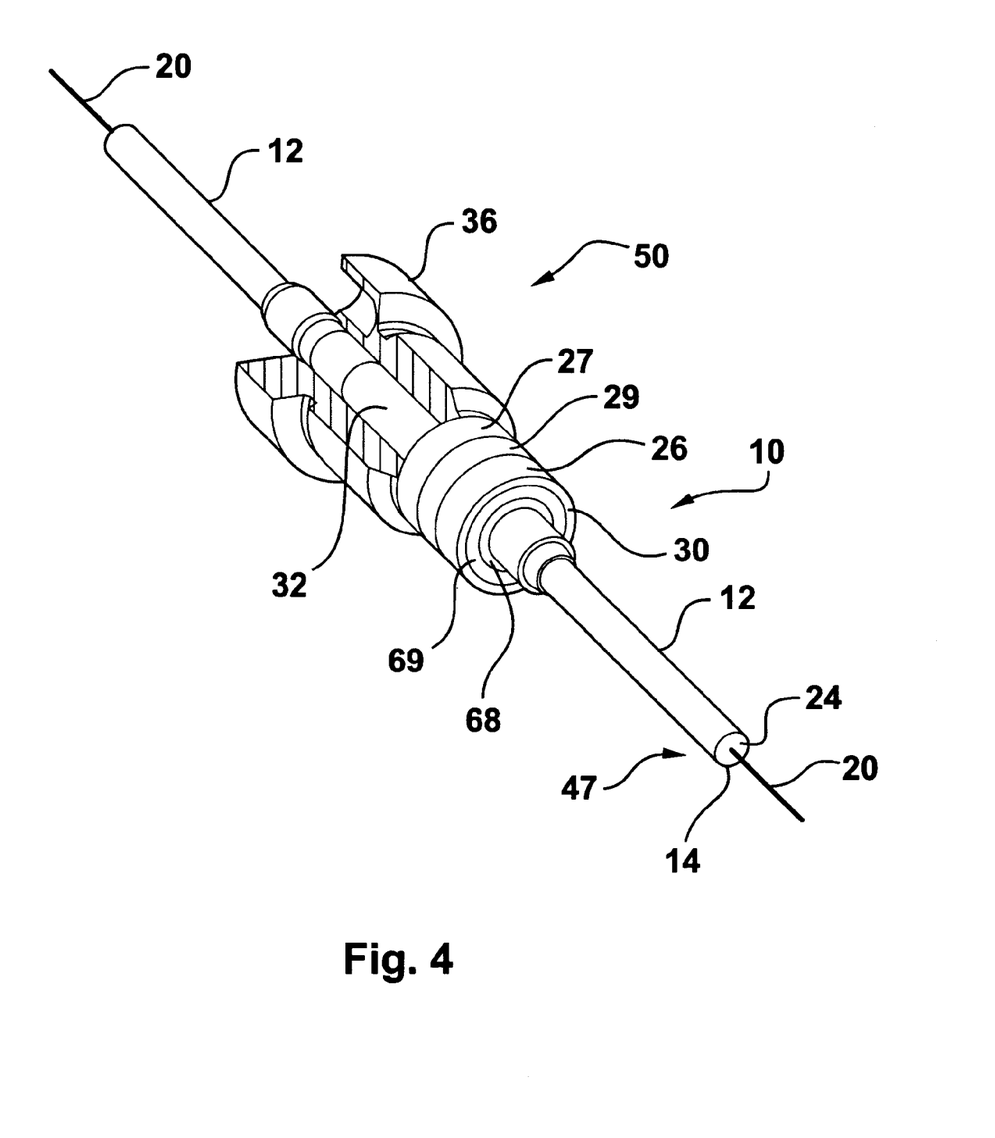
FIG. 4 is an isometric view in partial cross-section of an optical waveguide bulkhead feedthrough assembly of the present invention.

In FIG. 2, an optical waveguide bulkhead feedthrough assembly embodying the present invention is indicated generally by the reference numeral 10. As best shown in FIG. 2 the feedthrough assembly 10 comprises a feedthrough housing 11 having a body or tubular member (for example) 12 defining an axially elongated, annular surface 14 extending from approximately one end of the tubular member to the other, and an optical feedthrough cavity 16 formed within the annular surface. The annular surface 14 and feedthrough cavity 16 define an elongated axis 18. As shown in FIGS. 2 and 4, at least one optical waveguide 20 is received through the feedthrough cavity 16, and is spaced radially inwardly relative to the annular surface 14 to thereby define an axially elongated annular cavity 22 between the optical waveguide 20 and annular surface 14 and extending from one end of the tubular member 12 to the other.

A flowable adhesive or sealant 24, such as a polymeric sealant as will be more fully described herein below, is received within the annular cavity 22, surrounds the optical waveguide 20, and substantially fills the annular cavity 22 from approximately one end of the tubular member 14 to the other. As described further below, the sealant 24 exhibits liquid and solid phases, and is introduced in its liquid phase into one end of the annular cavity 22 and fills the annular cavity by capillary action. Then, the sealant 24 transitions from its liquid to its solid phase, and exhibits adhesive properties at the interfaces of the sealant and both the annular surface 14 and waveguide 20, to adhesively secure and hermetically seal the waveguide within the tubular member.

In the examples shown herein, and with reference to FIG. 2, the housing 11 of feedthrough assembly 10 further comprises a first sealing shoulder 26 and a second sealing shoulder 27 defining a groove 28 formed therebetween for receiving an o-ring 29, and a mounting surface 30 formed along a face of the first shoulder. Housing 11 further comprises a bearing shoulder 32 and a compression face 34 adapted to receive compression nut 36 (FIG. 3) for sealing the assembly in a bulkhead as will be explained more fully herein below.

As shown best in FIG. 2, the annular surface 14 defines an inner dimension (which also defines the outer dimension of the optical feedthrough cavity 16) having at least one variation along the axial direction thereof, which, as described further below, cooperates with the sealant 24 to substantially prevent movement of the sealant and optical waveguide relative to the annular surface. In the illustrated embodiment, the inner dimension of the annular surface 14, and the outer dimension of the optical feedthrough cavity 16, is the diameter "D", and as can be seen, the diameter varies along the axial direction between the diameter "D1" and the diameter "D2". As also shown in FIG. 2, in the illustrated embodiment, the tubular member 12 defines a plurality of radially inwardly projecting interruptions 42 in the annular cavity 22 and axially spaced relative to each other that define the variations in the diameter "D". The radially projecting interruptions 42 are defined by first surface areas shown typically at 43, and contiguous second surface areas shown typically at 44 that are spaced radially inwardly relative to the first surface areas. In the illustrated embodiment of the present invention, the radially projecting interruptions 42 are formed by radially crimping the tubular member 12 over a gage pin (not shown). As may be recognized by those skilled in the pertinent art based on the teachings herein, numerous other techniques equally may be employed for creating the radially inwardly projecting interruptions, such as by employing a premolded tubular member. In addition, the outer surface of the tubular member may be uniform and need not include dimensional variation. As also shown best in FIG. 2, transition regions shown typically at 45 extend between the first and second surface areas 43 and 44, respectively, and define smooth or rounded surfaces. As described further below, the rounded transition regions 45 promote the flow of sealant 24 throughout the annular cavity 22 in a substantially laminar manner to thereby define a substantially voidless layer of sealant.

One advantage of the radial projections 42 is that upon filling the annular cavity 22 with the sealant 24, and transitioning the sealant to its solid phase, the radial projections cooperate with the sealant to further prevent axial movement of the solid sealant plug and/or waveguide 20 in the axial direction. In high-pressure applications, the pressure applied to the sealant 24 at the high-pressure end of the assembly tends to force the sealant axially within the tube. If sufficient, the high pressure could over time break the adhesive bond between the sealant and annular surface of the tube and, in turn, force or extrude the sealant through the tube. However, the radial projections 42 (or like dimensional variations) provide a mechanical resistance to extrusion of the sealant out the low-pressure end of the feedthrough assembly, thereby providing an additional safety factor to the adhesive bonds. In addition, the radial projections 42 of the tubular member provide mechanical holding to prevent movement of the sealant plug in either the high or the low-pressure directions due to applied thermal and/or pressure cycles.

As may be recognized by those skilled in the pertinent art based on the teachings herein, the feedthrough assembly of the present invention may employ one or more such radially projecting interruptions or like dimensional variations, and the interruptions or like dimensional variations may take any of numerous different shapes or configurations. For example, rather than have the second surface portions 44 project radially inwardly, one or more of these surface portions may project radially outwardly relative to the contiguous second surface portion 43. In addition, the radially projecting surface portions need not extend annularly about the optical waveguide 20, but rather may extend over a more limited, or different surface area. For example, the radially projecting interruptions may be defined by one or more dimples or discrete protuberances formed on the annular surface 14. Alternatively, the radially projecting interruptions may be formed by discrete members fixedly secured to the annular surface, or otherwise projecting radially inwardly relative to the annular surface. Those skilled in the pertinent art may further recognize based on the teachings herein that the axially-elongated, annular surface 14 need not define a circular cross-sectional configuration, but rather may define any of numerous different shapes and/or configurations without departing from the scope of the present invention.

An alternative embodiment of the radially projecting interruptions is shown in FIG. 3 with reference to end crimps 46 formed on either end of tubular member 12. As in the either disclosed embodiments the annular surface 14 defines an inner dimension (which also defines the outer dimension of the optical feedthrough cavity 16) wherein end crimps 46 comprise the at least one variation along the axial direction thereof, which cooperates with the sealant 24 to substantially prevent movement of the sealant and optical waveguide relative to the annular surface. In this particular embodiment, the inner dimension of the annular surface 14, and the outer dimension of the optical feedthrough cavity 16, varies along the axial direction between the diameter "D2" to the diameter "D1" at either end of tubular member 12. The radially projecting interruptions 46 are defined by first surface areas shown typically at 43, and contiguous second surface areas shown typically at 44 that are spaced radially inwardly relative to the first surface areas. In this particular embodiment, the radially projecting interruptions 46 are formed by crimping the tubular member 12 only on the ends. As may be recognized by those skilled in the pertinent art based on the teachings herein, numerous other techniques equally may be employed for creating the radially inwardly projecting interruptions 46, such as by employing a pre-molded tubular member. A scan be recognized, the outer surface of the tubular member is uniform and need not include dimensional variation. As also shown best in FIG. 3, transition regions shown typically at 45 extend between the first and second surface areas 43 and 44, respectively, and define smooth or rounded surfaces. As described further below, the rounded transition regions 45 promote the flow of sealant 24 throughout the annular cavity 22 in a substantially laminar manner to thereby define a substantially voidless layer of sealant.

Referring to FIG. 4, the high-pressure end 47 of the feedthrough assembly 10, the sealant 24 is subjected to high-pressure fluid over its exposed end face. The force per unit area applied by such high-pressure fluid to the end face is a function of the outside diameter of the sealant 24 (or the diameter or other dimension defining the optical feedthrough cavity 16). Accordingly, as the outside diameter of the sealant 24 (or the diameter of the annular surface 14 or feedthrough cavity 16) is reduced, the reduction in total force applied by the high pressure fluid to the end face of the sealant 24 is a function of the diameter squared (or is a function of the circumference of the bond line to the annular surface 14 to the first power). Accordingly, as shown in FIGS. 2, 3 and 4, for relatively high pressure applications, a radially projecting interruption 42 is formed on at least the high pressure end 47 of the tubular member 12 to thereby reduce the outer diameter of the sealant 24 and, in turn, minimize the forces applied to the sealant in the axial direction. As shown best in FIG. 2, an embodiment of the tubular member 12 includes radially projecting interruptions 42 at both ends.

In an embodiment of the present invention, the sealant 24 is an epoxy capable of withstanding temperatures within the range of about 150° C. to about 250° C. and capable of exhibiting a viscosity within the range of about 3,000 centipoises through about 85,000 centipoises. In addition, the epoxy 24 in a certain embodiment is a 100% solids epoxy. Epoxies that are approximately 100% solids do not expel solvents or volatiles during cure, and therefore create a substantially void-free epoxy layer filling the annular cavity 22 from one end of the tubular member 12 to the other. Other epoxies may be used, depending on the particular application; however, epoxies that are not 100% solids may contain volatile compounds or solvents that escape or evaporate during cure. Thus, if such epoxies are employed in the apparatus of the present invention, any such volatiles might expand during cure and expel some or all of the epoxy within the tubular member 12. As a result, voids would likely remain within the annular cavity 22. Any such voids could, in turn, create non-axisymmetric stress fields, leading to high fiber stress, power attenuation in the fiber due to fiber bending, and collapse of one or more of the voids due to applied high pressures.

For long term service with high reliability, the sealant 24, such as the epoxies described above, exhibit a glass transition temperature that is significantly above the service temperature of the feedthrough assembly. One such sealant is an anhydride cure epoxy manufactured by Aremco Inc. under the designation "526N". The glass transition temperature of this epoxy is approximately 160° C. In addition, the viscosity of this epoxy at room temperature is approximately 85,000 centipoises, which, when employed in the present invention, is sufficiently high to prevent capillary action from drawing the epoxy through the annular cavity 22 without first lowering the viscosity by preheating the tubular member 12 and optical waveguide 20, as described further below.

As may be recognized by those skilled in the pertinent art based on teachings herein, the sealant 24 may take the form of any of numerous different sealants that are currently known or later become known for performing the functions of the sealant 24. For example, the sealant may take the form of any of numerous different polymeric sealants, such as any of numerous different epoxies or other thermoset resins, and such sealants may include fillers or other agents for obtaining the desired physical characteristics of the sealant for a particular application. For relatively high pressure and/or high temperature environments, such as for use in oil or gas wells, the sealant is preferably capable of withstanding continuous temperatures of at least 150° C., and continuous pressures of at least 15 kpsi, and most preferably is capable of withstanding continuous temperatures within the range of about 150° C. to about 175° C., and continuous pressures within the range of about 15 kpsi to about 20 kpsi. In addition, the preferred sealant for such applications is at such temperatures and/or pressures capable of resisting creep (i.e., material flow) and softening, and also is capable of maintaining the adhesive bond between the sealant and annular surface 14 and between the sealant and outer surface of the optical waveguide, such as the buffer layer of an optical fiber.

As also may be recognized by those skilled in the pertinent art based on the teachings herein, the optical waveguide 20 may be any of numerous different devices that are currently or later become known for conducting optical signals along a desired pathway. Accordingly, the optical waveguide 20 may include, for example, an optical fiber (such as a standard telecommunication single mode optical fiber), an optical fiber having a Bragg grating impressed (or embedded or imprinted) in the fiber, or any of numerous other types of optical waveguides, such as multi-mode, birefringent, polarization maintaining, polarizing, multi-core or multi-cladding optical waveguides, or flat or planar waveguides, any of which may be referred to as an optical fiber herein. In addition, the feedthrough assembly 10 may include a single such waveguide as shown in FIG. 1, or may include a plurality of such waveguides.

As also may be recognized by those skilled in the pertinent art based on the teachings herein, the body or tubular member 12 may be formed of any of numerous different materials that are currently or later become known for performing one or more of the functions of the tubular member (and annular surface) described herein. For high pressure and/or high temperature applications, the tubular member preferably exhibits high strength, corrosion resistance, temperature and pressure stability, and predictably induced plastic deformation. In an embodiment of the present invention, the tubular member 12 is formed of an annealed nickel alloy, such as the alloy sold by Inco Alloys International, Inc. under the mark "Inconel 600". However, as indicated above, any of numerous other materials may be suitable for the tubular member, such as stainless steel, other nickel-based alloys, including Incoloy® and Nimonic® (registered trademarks of Inco Alloys International, Inc.), carbon, chromium, iron, molybdenum, and titanium (e.g., Inconel 625). In addition, the tubular member 12 (or other structure forming the annular surface 14) may take any of numerous different shapes or configurations. For example, rather than a circular cross-sectional configuration, the tubular member or annular surface may have a square, rectangular, oval, elliptical, clam-shall or other desired shape.

Referring to FIG. 2 tubular member 12 is shown therein as being integral to housing 11. It will be appreciated by one skilled in the art that the two parts may be manufactured separately and joined together by a subsequent known process. For instance, in one particular embodiment housing 11 comprises a bore hole sized to accept the outer diameter of a separate tubular member 12. The tubular member is similar to that disclosed in the aforementioned U.S. patent application Ser. No. 09/628,114 filed contemporaneously herewith, the disclosure of which is hereby incorporated by reference in it's entirety. In such an embodiment tubular member 12 may be joined to housing 11 may any known method such as bonding or welding. In an embodiment wherein tubular member 12 is welded, by laser welding techniques for example, to housing 11 a weld may be made at either of the points indicated by arrow 49.

In accordance with the method of the present invention, and with reference to FIGS. 2 and 4, the feedthrough assembly 10 may manufactured by forming annular cavity 22 with a predetermined minimum width between the optical waveguide 20 and the annular surface 14 to allow the sealant 24 in its liquid phase to substantially fill the annular cavity by capillary action. A sealant 24 is selected which is capable of exhibiting a viscosity which allows the sealant to substantially fill the annular cavity 22 by capillary action, and also is capable of exhibiting a viscosity which substantially prevents leakage of the sealant out of one or both ends of the annular cavity upon substantially filling the cavity. The feed through assembly may be installed within a bulkhead or well head, as will be more fully described herein below, prior to the insertion of waveguide 20 or after such installation without departing from the method of the present invention. Sealant 24 is introduced in its liquid phase into the annular cavity, and is allowed to substantially entirely fill the annular cavity by capillary action. Although the sealant may be introduced into the annular cavity at either end, in a current embodiment, the sealant is introduced at the high pressure end 47. Upon filling the annular cavity 22, the sealant 24 transitions to its solid phase and adhesively secures the optical waveguide 20 within the optical feedthrough cavity 16, and substantially prevents movement of the sealant and the optical waveguide relative to the annular surface 14.

With the epoxy or like polymeric sealants of the present invention, the annular surface 14 and optical waveguide 20 are preheated to a predetermined elevated temperature prior to introducing the epoxy into the annular cavity. The annular surface and waveguide are heated to the first stage cure temperature of the epoxy. Then, the epoxy is introduced into one end of the cavity and heated to its first stage cure temperature upon contacting the preheated annular surface 14 and optical waveguide 20. This, in turn, reduces the viscosity of the epoxy to facilitate filling the annular cavity at a relatively rapid rate by capillary action.

One important step in the method of this embodiment is to select an adhesive or epoxy with a viscosity within a range that is low enough to allow it to be drawn by capillary action into the annular cavity 22, with or without lowering the viscosity by preheating, within a reasonable period of time. For example, if heat is applied to lower the viscosity prior to filling, but the viscosity is still too high for reasonably rapid filling, the epoxy may begin to harden and cure prior to filling the cavity and may thereby prevent complete filling of the cavity. Alternatively, if the viscosity of the epoxy is too low, the epoxy may not remain contained within the annular cavity 22 for a long enough time for curing to begin. As a result, the epoxy may leak out of the annular cavity 22 and cause an incomplete fill.

As described above, in the current embodiment of the present invention, an epoxy or other sealant capable of exhibiting a viscosity within the range of about 3,000 centipoises to about 85,000 centipoises has proven to be effective in manufacturing the optical feedthrough assemblies in accordance with the present invention. In one embodiment, the tubular member 12 defines a nominal inside diameter of about 0.022 inches, the overall length of the tubular member 12 is about 2.0 inches, the outside diameter of the fiber 20 over the buffer is about 0.006 inches, and the epoxy exhibits a viscosity in the range of about 3,000 centipoises to about 85,000 centipoises. In this embodiment, the diameter D2 is preferably within the range of about 0.015 to about 0.030 inch, and most preferably within the range of about 0.020 to about 0.025 inch. When the tubular member 12 and optical fiber 20 are preheated to about 90° C., the annular cavity 22 can be filled by capillary action in less than approximate five (5) minutes. Preferably, the maximum width "D2" (FIG. 1) of the annular plug of sealant 24 is no more than approximately twice the diameter of the optical waveguide(s) 20 (or maximum width) in order to fill the annular cavity by capillary propagation (or "wicking").

Next, the optical waveguide or fiber 20 is installed concentrically within the tubular member 12 with relatively high precision, typically within a true position of about 0.001 inches. One particularly versatile method of the invention that will accommodate geometry variations in the tubular member and/or waveguide is to utilize a high-precision, three-axis translation stage (not shown) of a type known to those of ordinary skill in the pertinent art on each end of the tubular member 12. Proper adjustment of these stages, while maintaining mild tension on the optical fiber sufficient to keep it straight, will align the fiber concentrically within the metal tube. A significant advantage of the approximately concentric alignment of the waveguide or fiber with the annular surface is that it provides an axisymmetric stress field on the fiber during epoxy curing, and during subsequent thermal and fluid pressure loading.

Figure 5:
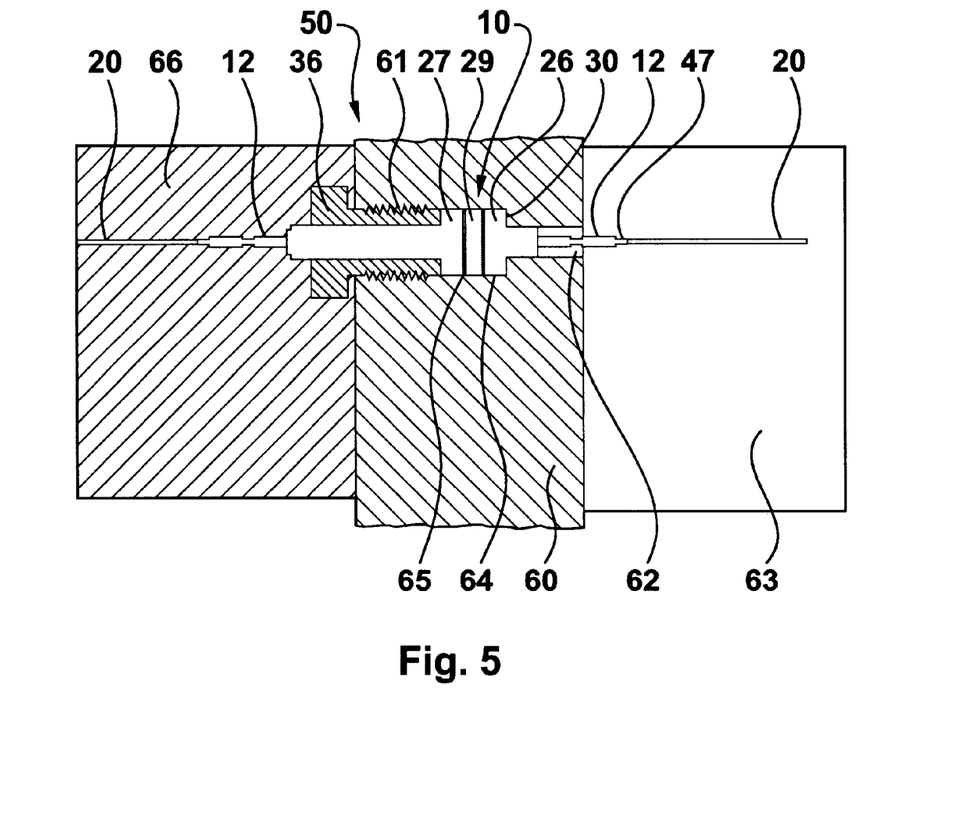
FIG. 5 is a partial cross-section of an optical waveguide bulkhead feedthrough assembly installed within a bulkhead.

Referring now to FIGS. 4 and 5, the bulkhead feedthrough assembly 50 comprises feedthrough assembly 10 as described herein above and further includes compression nut 36 installed on shoulder 32 of feedthrough assembly 10. Bulkhead feedthrough assembly 50 is shown installed, by way of example, into a well head outlet 60 via threaded engagement between compression nut 36 and internal threads 61 within port 62 of the well head outlet. Although shown mounted within a well head outlet 60, bulkhead feed through assembly 50 is well suited for engagement into other known types of bulkheads where a pressure differential exists between one side of the bulkhead and the other. In the embodiment shown in FIGS. 4 and 5, high pressure end 47 of feedthrough assembly 10 is positioned within the high pressure cavity 63 of well head outlet 60. In operation, bulkhead feed through assembly is located within port 62 with sealing face 30 positioned against wall 64 and sealing shoulders 26, 27 and o-ring 29 positioned in interference fit against bore 65. Compression nut 36 rotates freely upon shoulder 32 and when threaded within port 62 via threads 61 forces face 30 into sealing contact with wall 64. The seal provided by face 30 with wall 64 alone and in combination with shoulders 26, 27 and o-ring 29 prevent high pressure from the well head cavity 63 from leaking around bulkhead feedthrough 50 into the low pressure area depicted by 66. The sealant 24 and tubular member 12 of feedthrough assembly 10 as described herein above cooperate to prevent breach of the high pressure through the center of bulkhead feedthrough assembly 50. The bulkhead feedthrough assembly 50 may be used in any of numerous different types of optical based systems, such as pressure, temperature and/or force sensors, wherein waveguides are positioned through a bulk head separating two different pressure zones. In the case of a fiber optic based sensor system, waveguide 20 may be comprised of one or more fiber optic cables.

Referring again to FIG. 4 an alternative embodiment of optical waveguide bulkhead feedthrough assembly 50 includes a metallic primary seal 68 which when installed as described herein above enhances the sealing ability of the assembly. In operation, bulkhead feed through assembly is located within port 62 with sealing face 30 positioned against wall 64 and sealing shoulders 26, 27 and o-ring 29 positioned in interference fit against bore 65 metal primary seal 68 contacts wall 64 as well. Compression nut 36 rotates freely upon shoulder 32 and when threaded within port 62 via threads 61 forces face 30 and primary metal seal 68 into sealing contact with wall 64. Primary metal seal provides enhanced sealing capability by exerting a compressive force between the locating groove 69 within face 30 and wall 64. The collective sealing provided by face 30 and primary metal seal 68 with wall 64 in combination with shoulders 26, 27 and o-ring 29 prevent high pressure from the well head cavity 63 from leaking around bulkhead feedthrough 50 into the low pressure area depicted by 66.

Figure 6:
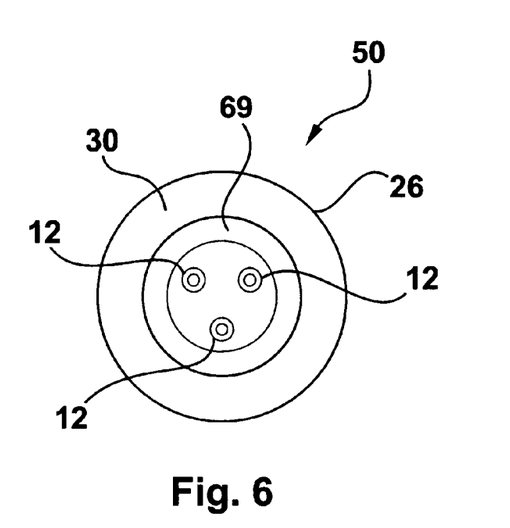
FIG. 6 is an end view of an alternative embodiment of the optical waveguide bulkhead feedthrough assembly of FIG. 2.

Although the exemplary assembly of FIG. 5 employs only a single optical waveguide bulkhead feedthrough assembly 50, other assemblies or systems requiring optical waveguide bulkhead feedthroughs may employ a plurality of such waveguide bulkhead feedthroughs in any of a plurality of different configurations. Referring for instance to FIG. 6 there is shown an alternative embodiment of optical waveguide bulkhead feedthrough assembly 50 that includes three feed through tubular members 12. Each feed through member 12 is sized to accommodate an optical wave guide and thus the embodiment shown in FIG. 6 would permit the passage of three waveguides through a bulkhead or well head outlet in the same manner as that described herein above with respect to a single optical waveguide embodiment.

In some cases, the waveguide 20 may include an external buffer, particularly in the region where the waveguide passes through the feedthrough assembly, wherein the buffer is made of a material to which it is difficult to create a strong and reliable adhesive bond, such as polyamide or Teflon®. A relatively weak bond of this type could cause an eventual failure of the feedthrough assembly by fluid leakage along the interface, and/or by allowing movement of the waveguide 20 relative to the tubular member 12 due to complete adhesive bond failure. In order to overcome this deficiency, an alternative embodiment of the present invention involves removing the waveguide or fiber buffer locally over a fraction of the length of the fiber passing through the feedthrough assembly to expose the underlying optical glass surface. Then, the exposed optical glass surface is treated with an adhesion promoter, such as silane. The epoxy adhesive or other sealant 24 is then introduced by capillary action into the annular cavity 22 in the manner described above. Alternatively, the silane or other adhesion promoter can be pre-mixed with the epoxy adhesive in a manner known to those of ordinary skill in the pertinent art.

In addition to treating the glass for improving the epoxy-to-glass bond (or other sealant-to-glass bond), the annular surface 14 of the tubular member 12 may be treated in a like manner to improve the epoxy-to-metal bond (or other sealant-to-metal bond). However, the improvement in the epoxy-to-metal bond achieved with such treatment is typically not as great as is seen with the epoxy-to-glass bond. In one embodiment, silane sold under the mark "A-1100" and manufactured by Witco Corp. of Greenwich, Conn. is employed. However, as may be recognized by those skilled in the pertinent art based on the teachings herein, any of numerous other adhesion promoters, or methods for promoting adhesion, which are currently known or later become known for performing the function of the adhesion promoter described herein, may be employed.

One advantage of the present invention is that the feedthroughs disclosed are resistant to creep and/or extrusion along the elongated axis of the optical fiber, and therefore are capable of exhibiting significantly improved service lives in comparison to the prior art feedthroughs described above.

Another advantage of the present invention is that the axial length of the feedthrough is sufficiently long to provide a sufficient margin of safety, such that some gradual degradation or failure of the adhesive bond can occur without causing fluid leakage through the feedthrough, or movement of the fiber relative to the tubular member. In accordance with certain embodiments of the present invention, the overall length of the annular cavity 22 preferably is at least approximately 50 times the diameter D2 of the annular surface 14 (or if the annular surface defines a cross sectional shape other than circular, the length is preferably 50 times the width of the feedthrough cavity 16), and most preferably this ratio is at least 100:1.

A significant advantage of the present invention over existing optical waveguide bulkhead feedthroughs is that the feedthrough assembly of the invention provides for essentially zero optical loss with certain fiber types, such as single mode, high numerical aperture 'bend-insensitive' fiber, due to the continuous fiber path through the feedthrough, and the use of low elastic modulus epoxy adhesives or other sealants surrounding the fiber which create low micro-bending losses.

Another advantage of the present invention is the ease of manufacture, due to the lack of need to create a 'break' in an otherwise continuous fiber, which would require terminating the fiber in some way which is usually expensive, labor intensive, and subject to loss or scrapping of valuable optical components which may be integrally attached to this fiber 'pigtail'.

The feedthrough assembly of the present invention achieves these advantages while maintaining high reliability for long term service at very elevated temperatures and pressures. Another significant advantage of the present invention is the ability to fill the annular cavity between the tubular member and optical waveguide or fiber completely using capillary action. Injection of epoxy or other sealant by conventional means, on the other hand, into such a small volume is essentially impossible, and injection into large volumes is subject to the formation of voids in the epoxy or other sealant, which can, in turn, create non-axisymmetric stresses on the fiber due to applied pressure and temperature, leading to failure due to fluid leakage and/or fiber breakage.

It should be understood that the dimensions, geometries, and materials described for the embodiments disclosed herein are for illustrative purposes and as such, any other dimensions, geometries, or materials may be used if desired, depending on the application, size, performance, manufacturing or design requirements, or other factors, in accordance with the teachings herein. For example, the axially-elongated surface 14 may be defined by the feedthrough member, such as the bulkhead itself, and need not be defined by a separate tubular member of other body of the feedthrough assembly. In addition, numerous changes and modifications may be made to the above described and other embodiments of the present invention without departed from the scope of the invention as defined in the appended claims. It should also be understood that any of the features, characteristics, alternatives or modifications described regarding a particular embodiment herein may also be applied, used, or incorporated with any other embodiment described herein. Accordingly, this detailed description of preferred embodiments is to be taken in an illustrative, as opposed to a limiting sense.

What is claimed is:

1. A feedthrough assembly for passing at least one optical waveguide through a structure, comprising:
    a housing coupleable to the structure;
    at least one axial cavity formed in the housing having an axial length, wherein the cavity comprises a surface having a first dimension, and wherein the cavity comprises at least one variation in its surface with a second dimension different from the first dimension;
    at least one optical waveguide received through the cavity and spaced relative to the surface; and
    a sealant along substantially the entire length of the cavity and between the at least one optical waveguide and the surface, wherein the sealant is exposeable to a pressure at an end of the cavity, and wherein the sealant cooperates with the at least one variation in the surface to prevent axial movement of the optical waveguide in the cavity when the sealant is exposed to the pressure at an end of the cavity.

2. The feedthrough assembly of claim 1, wherein the sealant is a polymeric sealant.

3. The feedthrough assembly of claim 1, wherein the sealant is an epoxy.

4. The feedthrough assembly of claim 1, wherein the sealant does not contain voids.

5. The feedthrough assembly of claim 1, wherein the sealant contains approximately 100% solids.

6. The feedthrough assembly of claim 1, wherein the sealant is capable of forming a seal at operating temperatures of about 150 to about 250 degree Centigrade.

7. The feedthrough assembly of claim 1, wherein the sealant has a viscosity of 3,000 to 85,000 centipoise.

8. The feedthrough assembly of claim 1, wherein the second dimension is smaller than the first dimension.

9. The feedthrough assembly of claim 1, wherein the second dimension is larger than the first dimension.

10. The feedthrough assembly of claim 1, wherein the cavity is cylindrical.

11. The feedthrough assembly of claim 1, wherein the variation is annular with respect to the cavity.

12. The feedthrough assembly of claim 1, further comprising a compression nut positioned on the housing for mounting the housing to the structure.

13. The feedthrough assembly of claim 1, further comprising a means for facilitating a tight seal between the housing and the structure.

14. The feedthrough assembly of claim 1, wherein the optical waveguide has an outer glass surface in contact with the sealant.

15. The feedthrough assembly of claim 1, wherein the sealant cooperates with the at least one variation in the surface to prevent axial movement of the optical waveguide in the cavity.

16. The feedthrough assembly of claim 1, wherein the sealant is positioned in the cavity by capillary action between the optical waveguide and the surface.

17. The feedthrough assembly of claim 1, wherein the at least one optical waveguide is an optical fiber.

18. The feedthrough assembly of claim 1, wherein the axis of the cavity is linear.

19. The feedthrough assembly of claim 1, wherein the housing has a first end coupleable to a first pressure zone and a second end coupleable to a second pressure zone, wherein the first pressure zone is higher than the second pressure zone, and wherein a first variation appears proximate the first end, and a second variation appears proximate the second end.

20. The feedthrough assembly of claim 1, wherein the length of the cavity is at least fifty times greater than the first dimension.

21. The feedthrough assembly of claim 1, wherein the optical waveguide has a third outer dimension, and wherein the first dimension is less than or equal to two times the third dimension.

22. A method of making a feedthrough assembly for passing at least one optical waveguide through a structure, comprising, in order:
    forming an axial cavity through a housing having an axial length, wherein the cavity has a first and second openings at the ends of the cavity, and wherein the cavity comprises a surface having a first dimension, and wherein the housing is coupleable to the structure;
    positioning at least one optical waveguide through the cavity and out the first and second ends; and
    injecting a liquid sealant at the first opening of the cavity to fill a space between the optical waveguide and the surface by capillary action.

23. The method of claim 22, wherein the sealant is located along substantially the entire length of the cavity.

24. The method of claim 22, further comprising forming at least one variation in the surface of a second dimension different from the first dimension.

25. The method of claim 22, further comprising, prior to injecting the sealant, aligning the optical waveguide along the axis of the cavity.

26. The method of claim 25, wherein aligning the optical waveguide comprises placing the optical waveguide under tension.

27. The method of claim 22, further comprising, prior to injecting the sealant, heating the housing so that the sealant is provided to the first end of a warmed cavity.

28. The method of claim 22, wherein the sealant is a polymeric sealant.

29. The method of claim 22, wherein the sealant is an epoxy.

30. The method of claim 22, wherein the sealant does not contain voids.

31. The method of claim 22, wherein the sealant contains approximately 100% solids.

32. The method of claim 22, wherein the sealant is capable of forming a seal at operating temperatures of about 150 to about 250 degree Centigrade.

33. The method of claim 22, wherein the sealant has a viscosity of 3,000 to 85,000 centipoise.

34. The method of claim 24, wherein the second dimension is smaller than the first dimension.

35. The method of claim 24, wherein the second dimension is larger than the first dimension.

36. The method of claim 22, wherein the cavity is cylindrical.

37. The method of claim 24, wherein the variation is annular with respect to the cavity.

38. The method of claim 22, further comprising positioning a compression nut on the housing for mounting the housing to the structure.

39. The method of claim 22, further comprising affixing to the housing a means for facilitating a tight seal between the housing and the structure.

40. The method of claim 22, further comprising exposing an outer glass surface of the optical waveguide prior to positioning the optical waveguide through the cavity.

41. The method of claim 22, wherein the at least one optical waveguide is an optical fiber.

42. The method of claim 22, wherein the axis of the cavity is linear.

43. The method of claim 22, wherein the housing has a first end coupleable to a first pressure zone and a second end coupleable to a second pressure zone, wherein the first pressure zone is higher than the second pressure zone, and wherein a first variation in the cavity appears proximate the first end and a second variation appears proximate the second end.

44. The method of claim 22, wherein the length of the cavity is at least fifty times greater than the first dimension.

45. The method of claim 22, wherein the optical waveguide has a third outer dimension, and wherein the first dimension is less than or equal to two times the third dimension.

46. The method of claim 24, wherein the at least one variation is formed by crimping the housing to partially collapse the cavity.

47. A feedthrough assembly for passing at least one optical waveguide through a structure, comprising:
a housing coupleable to the structure; and
at least one axial cavity formed in the housing having an axial length, wherein the cavity consists of:
a surface having a first dimension, and wherein the cavity comprises at least one variation in its surface with a second dimension different from the first dimension,
at least one optical waveguide received through the cavity and spaced relative to the surface, and
a sealant along substantially the entire length of the cavity and between the at least one optical waveguide and the surface.

48. The feedthrough assembly of claim 47, wherein the sealant is a polymeric sealant.

49. The feedthrough assembly of claim 47, wherein the sealant is an epoxy.

50. The feedthrough assembly of claim 47, wherein the sealant does not contain voids.

51. The feedthrough assembly of claim 47, wherein the sealant contains approximately 100% solids.

52. The feedthrough assembly of claim 47, wherein the sealant is capable of forming a seal at operating temperatures of about 150 to about 250 degree Centigrade.

53. The feedthrough assembly of claim 47, wherein the sealant has a viscosity of 3,000 to 85,000 centipoise.

54. The feedthrough assembly of claim 47, wherein the second dimension is smaller than the first dimension.

55. The feedthrough assembly of claim 47, wherein the second dimension is larger than the first dimension.

56. The feedthrough assembly of claim 47, wherein the cavity is cylindrical.

57. The feedthrough assembly of claim 47, wherein the variation is annular with respect to the cavity.

58. The feedthrough assembly of claim 47, further comprising a compression nut positioned on the housing for mounting the housing to the structure.

59. The feedthrough assembly of claim 47, further comprising a means for facilitating a tight seal between the housing and the structure.

60. The feedthrough assembly of claim 47, wherein the optical waveguide has an outer glass surface in contact with the sealant.

61. The feedthrough assembly of claim 47, wherein the sealant cooperates with the at least one variation in the surface to prevent axial movement of the optical waveguide in the cavity.

62. The feedthrough assembly of claim 47, wherein the sealant is positioned in the cavity by capillary action between the optical waveguide and the surface.

63. The feedthrough assembly of claim 47, wherein the at least one optical waveguide is an optical fiber.

64. The feedthrough assembly of claim 47, wherein the axis of the cavity is linear.

65. The feedthrough assembly of claim 47, wherein the housing has a first end coupleable to a first pressure zone and a second end coupleable to a second pressure zone, wherein the first pressure zone is higher than the second pressure zone, and wherein a first variation appears proximate the first end, and a second variation appears proximate the second end.

66. The feedthrough assembly of claim 47, wherein the length of the cavity is at least fifty times greater than the first dimension.

67. The feedthrough assembly of claim 47, wherein the optical waveguide has a third outer dimension, and wherein the first dimension is less than or equal to two times the third dimension.

* * * * *